(12) United States Patent
Yoo

(10) Patent No.: US 6,373,896 B1
(45) Date of Patent: Apr. 16, 2002

(54) DEVICE AND METHOD FOR CODING AUDIO/VIDEO SIGNAL

(75) Inventor: Ki Ryung Yoo, Kyonggi-do (KR)

(73) Assignee: Hynix Semiconductor, Inc., Kyoungki-do (KR)

( * ) Notice: Subject to any disclaimer, the term of this patent is extended or adjusted under 35 U.S.C. 154(b) by 0 days.

(21) Appl. No.: 09/314,140

(22) Filed: May 19, 1999

(30) Foreign Application Priority Data

Dec. 30, 1998 (KR) ............................................ 98-61780

(51) Int. Cl.[7] ................................................. H04N 7/12
(52) U.S. Cl. .............................. 375/240.21; 375/240.29
(58) Field of Search ................................. 348/424, 425, 348/399.1, 572; 375/240.21, 240.22, 240.26, 240.29; H04N 7/12

(56) References Cited

U.S. PATENT DOCUMENTS

| | | | | |
|---|---|---|---|---|
| 4,897,719 A | * | 1/1990 | Griffin ..................... | 375/240.12 |
| 5,293,369 A | * | 3/1994 | Melas et al. ................... | 369/59 |
| 5,594,494 A | | 1/1997 | Okada et al. | |
| 5,910,906 A | * | 6/1999 | Schmitt .................. | 364/724.09 |
| 6,004,028 A | * | 12/1999 | Bottomley ................. | 371/37.7 |
| 6,195,394 B1 | * | 2/2001 | Arbeiter et al. ........ | 375/240.29 |

* cited by examiner

*Primary Examiner*—Nhon T Diep
(74) *Attorney, Agent, or Firm*—Birch, Stewart, Kolasch & Birch, LLP

(57) ABSTRACT

Device and method for coding an audio/video signal, in which a sampling rate is shifted according to a variance of a received data during data sampling operation for improving a coding efficiency, the device including a first sample/hold unit for sampling/holding an analog video signal at a first sampling rate in response to a sampling control signal, a phase shifter for shifting a phase of the sampling control signal according to a variance of the video signal, a second sampling/hold unit for sampling/holding an analog video signal at a second sampling rate in response to the sampling control signal shifted by the phase shifter, a summer for summing the sampling data from the first sample/hold unit and the sampling data from the second sample/hold unit, a comparator for comparing the sampling data summed at the summer to an arbitrarily set critical value, a switching unit for selectively providing the sampling data either from the first sample/hold unit or from the second sample/hold unit in response to a signal from the comparator, a quantizing unit for quantizing the sampling data selectively provided by the switching unit, and an encoding block for compressing a data from the quantizing unit, to provide an encoded data.

6 Claims, 7 Drawing Sheets

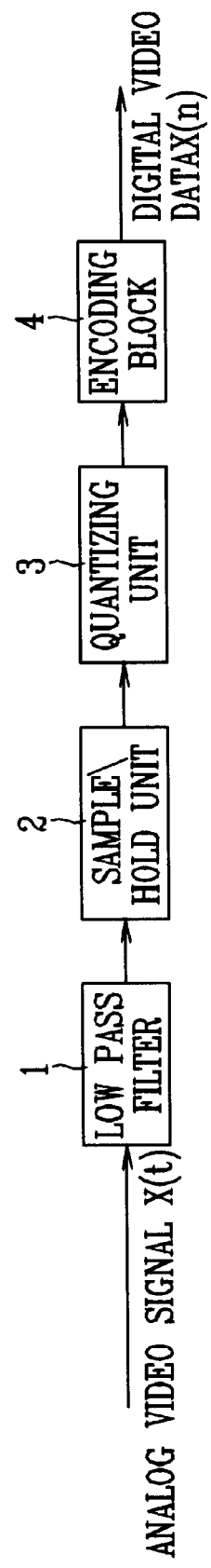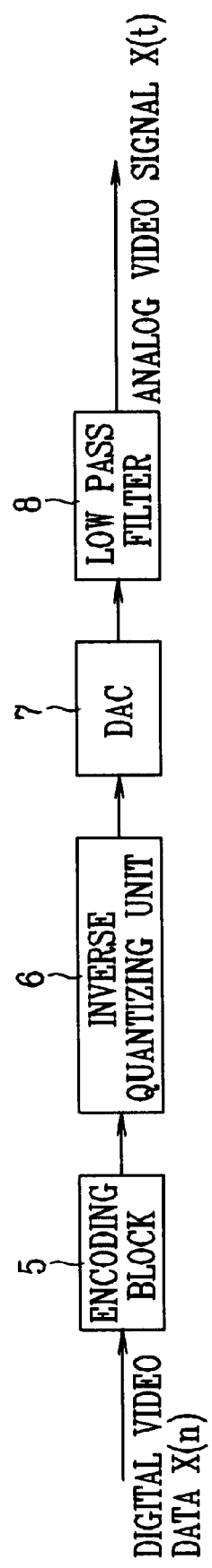

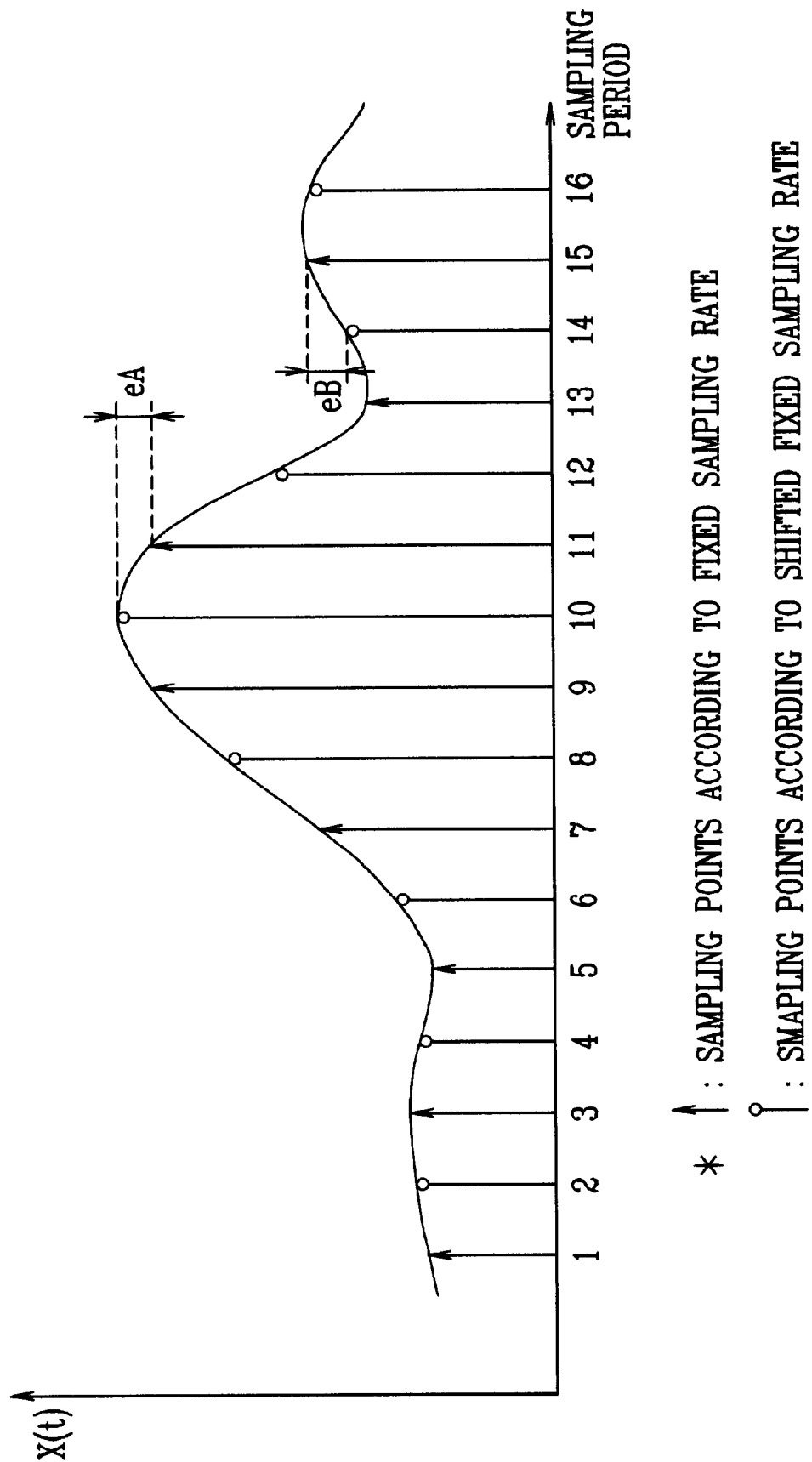

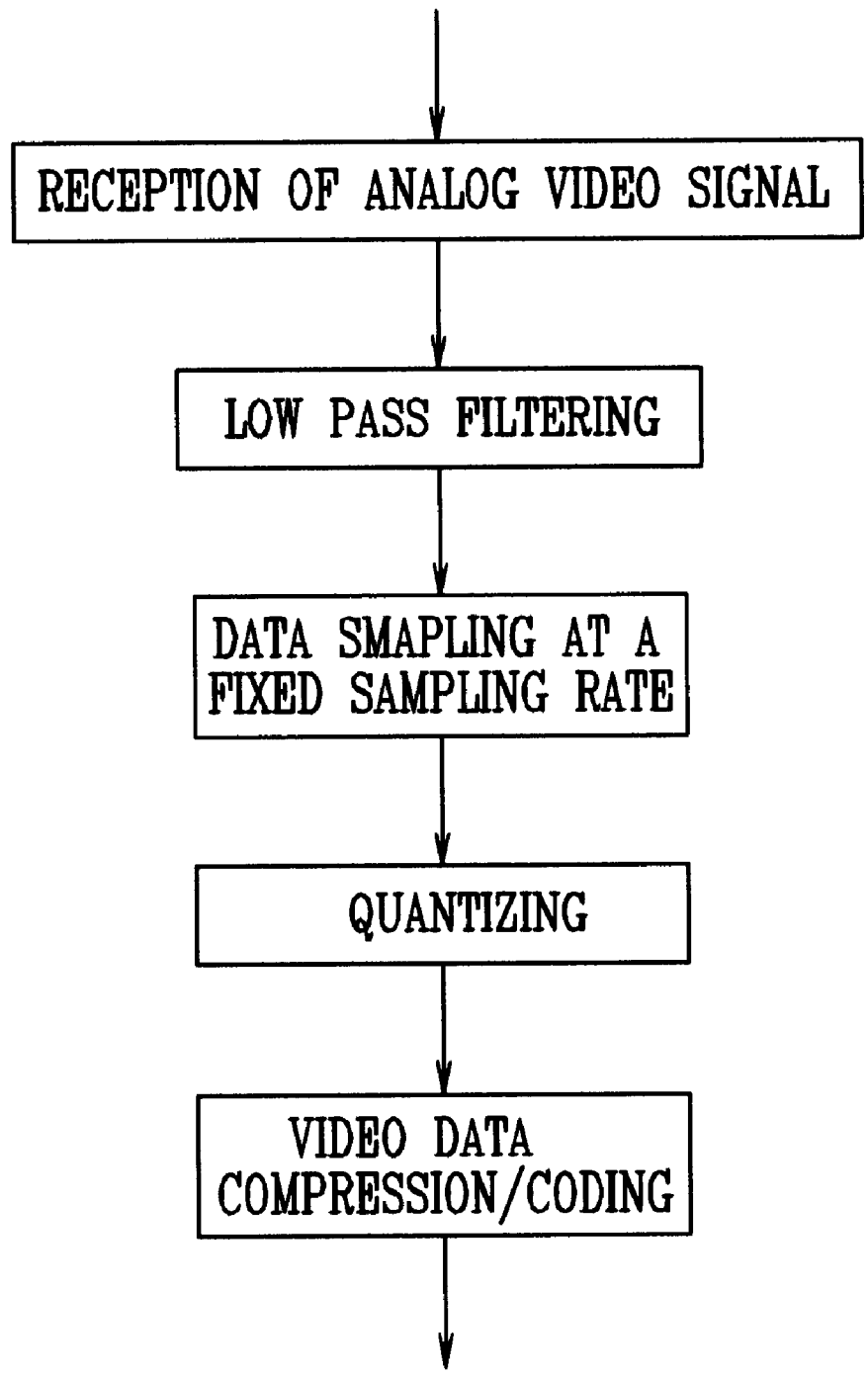

DEVICE AND METHOD FOR CODING AUDIO/VIDEO SIGNAL

BACKGROUND OF THE INVENTION

1. Field of the Invention

The present invention is related to a compression coding of a video signal, and more particularly, to a device and method for coding an audio/video signal, in which a sampling rate is shifted according to a variance of a received data during data sampling operation for improving a coding efficiency.

2. Background of the Related Art

A related art audio/video coding will be explained with reference to the attached drawings. FIG. 1a illustrates a block diagram of a related art encoder for coding an audio/video signal, and FIG. 1b illustrates a block diagram of a related art decoder for decoding an audio/video signal.

The related art encoder, mostly provided in a transmitter block in a video data transmission/reception device is provided with a low pass filter 1 for low pass filtering an analog video signal X(t) to remove a noise from a high frequency region thereof, a sample/hold unit 2 for sampling the video signal filtered by the low pass filter 1 at a fixed sampling rate, a quantizing unit 3 for quantizing a sampled/held signal, and an encoding block 4 for compressing a data from the quantizing unit 3 to provide an encoded digital signal. And, the related art decoder is provided with a decoding block 5 for decoding the encoded digital signal, an inverse quantizing unit 6 for inverse quantizing the decoded video signal, a DAC 7 for converting the inverse quantized video data into analog signal, and a low pass filter 8 for low pass filtering the video data converted into the analog signal.

A data coding operation in the aforementioned related art device for coding an audio/video will be explained. FIG. 2 illustrates sampling spectrums in a related art coding operation, and FIG. 3 illustrates a related art coding operation sequence of an audio/video signal. A related art sequence of video data compression/encoding is as follows.

First, upon reception of an analog video signal X(t), the analog video signal X(t) is filtered at the low pass filter 1, to remove a noise in a high frequency region thereof. Then, the filtered video signal is sampled at a fixed sampling rate at the sample/hold unit 2. The sampled/hold signal is quantized at the quantizing unit 3, and the quantized data is compressed/encoded at the encoding block 4, to provide a digital video signal.

Because the data sampling rate is fixed in the related art audio/video signal coding regardless of a variance of the received data, a sampling error is liable to occur if the variance of the received data is great and a volume of sampling data becomes too great unnecessarily if the variance of the received data is small. That is, in the related art coding of an audio/video signal, a sampling error eA or eB as shown in FIG. 2 is generated if the variance of the received data is great because the sampling rate is fixed in data sampling operation. And, a volume of the sampled data becomes too great unnecessarily even though a smaller volume of data is satisfactory if the variance of the received data is smaller because the data sampling operation is made according to the fixed sampling rate.

SUMMARY OF THE INVENTION

Accordingly, the present invention is directed to device and method for coding an audio/video signal that substantially obviates one or more of the problems due to limitations and disadvantages of the related art.

An object of the present invention is to provide device and method for coding an audio/video signal, in which a sampling rate is shifted according to a variance of a received data in a data sampling operation, for improving a coding efficiency.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the device for coding an audio/video signal includes a first sample/hold unit for sampling/holding an analog video signal at a first sampling rate in response to a sampling control signal, a phase shifter for shifting a phase of the sampling control signal according to a variance of the video signal, a second sampling/hold unit for sampling/holding an analog video signal at a second sampling rate in response to the sampling control signal shifted by the phase shifter, a summer for summing the sampling data from the first sample/hold unit and the sampling data from the second sample/hold unit, a comparator for comparing the sampling data summed at the summer to an arbitrarily set critical value, a switching unit for selectively providing the sampling data either from the first sample/hold unit or from the second sample/hold unit in response to a signal from the comparator, a quantizing unit for quantizing the sampling data selectively provided by the switching unit, and an encoding block for compressing a data from the quantizing unit, to provide an encoded data.

In other aspect of the present invention, there is provided a method for coding an audio/video signal, including the steps of (1) sampling a filtered video signal at a fixed sampling rate and a shifted sampling rate, (2) summing a sampled data of the fixed sampling rate and a sampled data of a shifted sampling rate, and comparing to an arbitrary critical value, and (3) as a result of the comparison of the summed sampled data to the arbitrary critical value, the sampled data of the fixed sampling rate is forwarded if a summed output is not smaller than the critical value, and the sampled data of the shifted sampling rate is forwarded if the summed output is smaller than the critical value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention:

In the drawings:

FIG. 1a illustrates a block diagram of a related art encoder for coding an audio/video signal;

FIG. 1b illustrates a block diagram of a related art decoder for decoding an audio/analog video signal;

FIG. 2 illustrates sampling spectrums in a related art coding operation;

FIG. 3 illustrates a related art coding operation sequence of an audio/video signal;

DETAILED DESCRIPTION OF THE PREFERRED EMBODIMENT

Figure 4A:
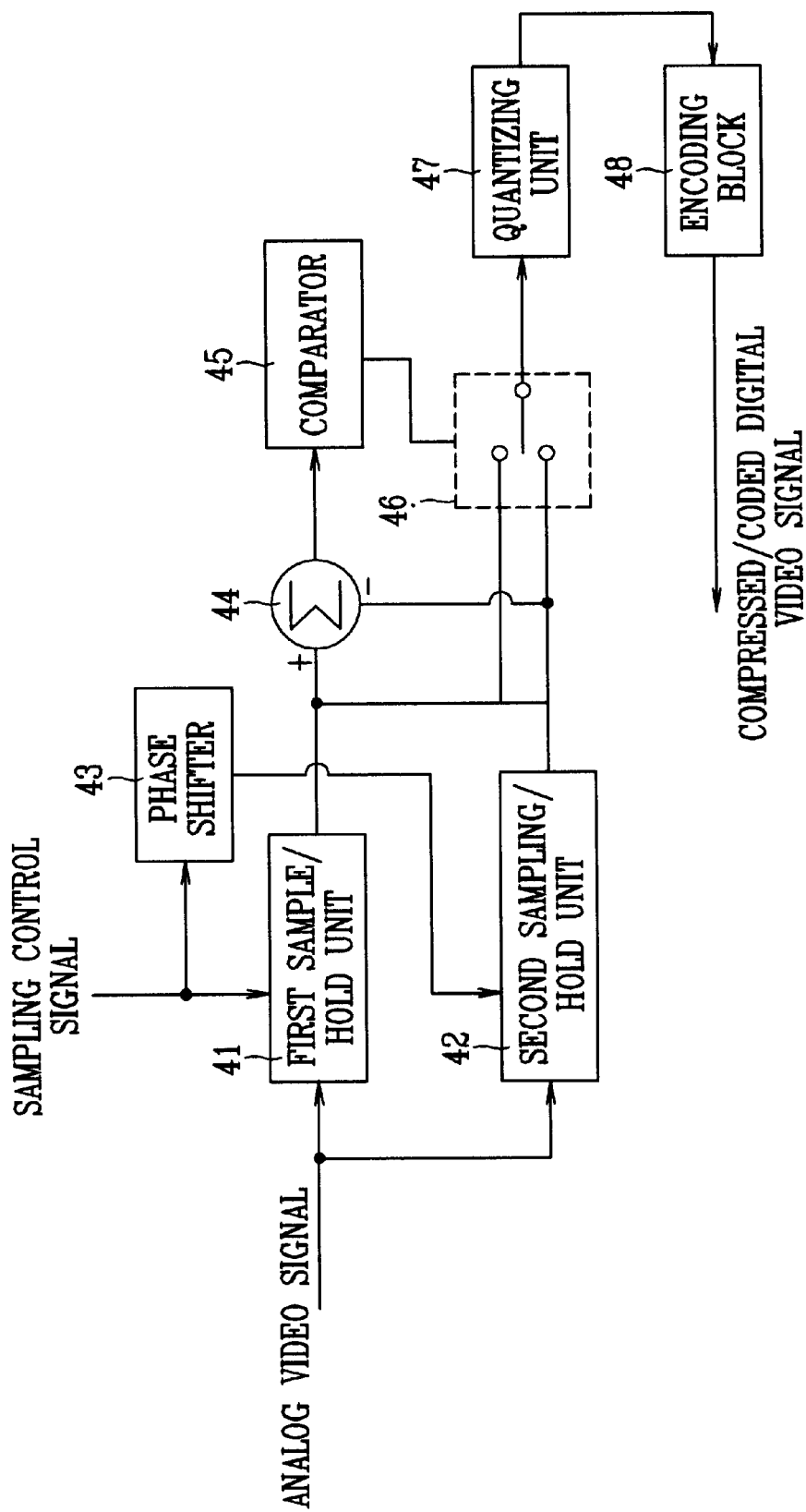
FIG. 4a illustrates a block diagram of an encoder for coding an audio/video signal in accordance with a preferred embodiment of the present invention.
Figure 4B:
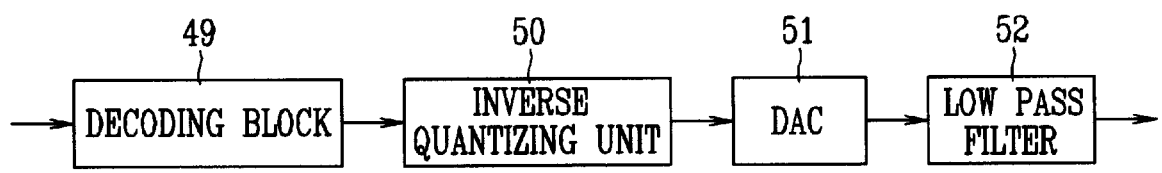
FIG. 4b illustrates a block diagram of a decoder for decoding an audio/video signal in accordance with a preferred embodiment of the present invention.

Reference will now be made in detail to the preferred embodiments of the present invention, examples of which are illustrated in the accompanying drawings. FIG. 4a illustrates a block diagram of an encoder for coding an audio/video signal in accordance with a preferred embodiment of the present invention, and FIG. 4b illustrates a block diagram of a decoder for decoding an audio/video signal in accordance with a preferred embodiment of the present invention.

A device for coding an audio/video signal in accordance with a preferred embodiment of the present invention, for sampling data at a first sampling rate and a second sampling rate which is a shifted first sampling rate, includes a first sample/hold unit 41 for sampling/holding an analog video signal X(t), band pass filtered and provided thereto, at a first sampling rate in response to a sampling control signal, a phase shifter 43 for shifting a phase of the sampling control signal according to a variance of the video signal, a second sampling/hold unit 42 for sampling/holding an analog video signal X(t), band pass filtered and provided thereto, at a second sampling rate in response to a sampling control signal shifted by the phase shifter 43, a summer 44 for summing the sampling data(+) from the first sample/hold unit 41 and the sampling data(−) from the second sample/hold unit 42, a comparator 45 for comparing the sampling data summed at the summer 44 to an arbitrary set critical value eT, a switching unit 46 for either providing the sampling data from the first sample/hold unit 41 if an output from the summer 44 is not smaller than the critical value eT or providing the sampling data from the second sample/hold unit 42 if the output from the summer 44 is smaller than the critical value eT in response to a signal from the comparator 45, a quantizing unit 47 for quantizing the sampling data selectively provided by the switching unit 46, and an encoding block 48 for compressing a data from the quantizing unit 47, to provide an encoded data. And, a decoder for decoding an audio/video signal in accordance with a preferred embodiment of the present invention includes a decoding block 49 for decoding an encoded digital signal, an inverse quantizing unit 50 for inverse quantizing a decoded video signal, a DAC 51 for converting an inverse quantized video data into an analog signal, and a low pass filter 52 for low pass filtering the video data converted into the analog signal. The phase shifter 43 shifts a phase of the sampling control signal by ½, and may be of a delay.

Figure 5:
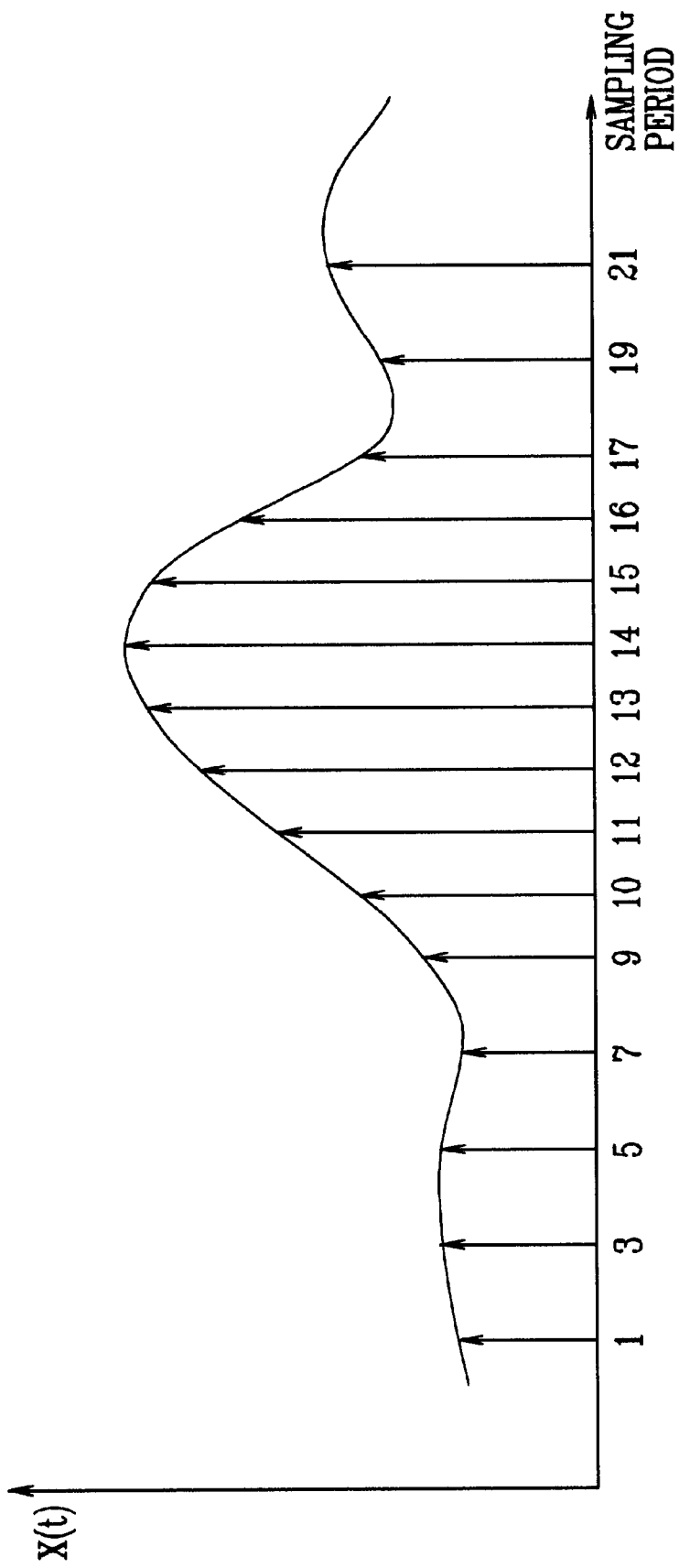
FIG. 5 illustrates sampling spectrums in a coding operation in accordance with a preferred embodiment of the present invention; and, FIG. 6 illustrates a sequence of a coding operation of an audio/video signal in accordance with a preferred embodiment of the present invention.
Figure 6:
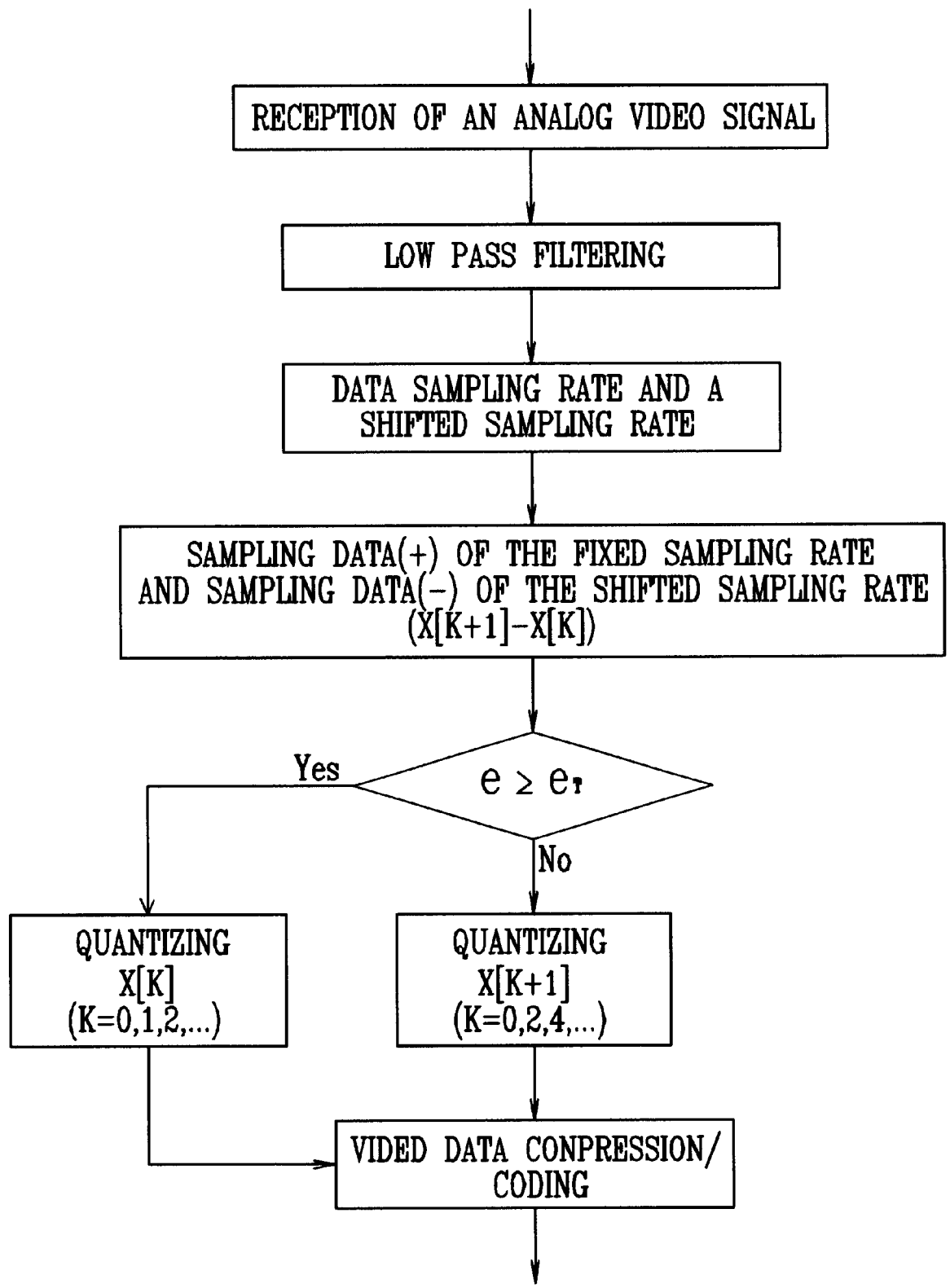

An audio/video signal coding operation of the aforementioned device for coding audio/video signal in accordance with a preferred embodiment of the present invention will be explained. FIG. 5 illustrates sampling spectrums in a coding operation in accordance with a preferred embodiment of the present invention, and FIG. 6 illustrates a sequence of a coding operation of an audio/video signal in accordance with a preferred embodiment of the present invention.

First, upon reception of an analog video signal X(t), the analog video signal X(t) is low pass filtered, to remove a noise from a high frequency region thereof Then, the filtered video signal is sampled at the first, and second sample/hold unit 41 and 42 at a fixed sampling rate and a shifted sampling rate. If it is assumed that entire sampled data are X[1], X[2], X[3], X[4], . . . , the first sample/hold unit 41 samples data of X[1], X[3], . . . and the second sample/hold unit 42 samples data of X[2], X[4], . . . Then, the data(+) sampled at the fixed sample rate and the data(−) sampled at the shifted sample rate are summed, and compared to an arbitrary critical value. In the comparison of the summed sampled data to an arbitrarily set critical value eT, if the summed output is not smaller than the critical value eT, a sampled data of the fixed sample rate is forwarded, and if the summed output is smaller than the critical value eT, a sampled data of the shifted sample rate is forwarded. That is, X[2]−X[1] is a sampling error eK, and the sampling error eK is compared to the critical value eT, to carry out the sampling operation at a sampling rate different depending on the comparison. For example, if the sampling error eK is greater than the critical value eT, X[1] and X[2] are coded before being forwarded, but if the sampling error eK is smaller than the critical value eT, X[2] is not coded before being forwarded. Then, the video signal, selectively sampled/held and forwarded, is quantized, and, compressed/encoded at the encoding block 48, to provide a digital video signal. An existence of sampled data not coded in the decoder is determined using a quantizing vector or a separate bit combination. An uncoded data is interpolated at the decoder. Or, alternatively, the existence of an uncoded sampled data is determined using an adaptive filter. FIG. 5 illustrates sampling positions of a received data, wherefrom it can be known that the sampling rate is varied with a variance of the received data.

The data sampling rate varied with a variance of the received data in the audio/video signal coding of the present invention can suppress an occurrence of coding error when the variance of the received data is great, and can prevent the sampled data from being unnecessarily voluminous when the variance of the received data is small. Though the device for coding an audio/video data of the present invention is thus designed to shift sampling rates in two, a separate shift block or a separate delay block may be provided, for providing more varied sampling rates.

The device and method for coding an audio/video signal of the present invention have the following advantages.

The sampling rate varied with a variance of the received data can suppress an occurrence of a coding error when the variance of the received data is great, and prevent the sampled data from being unnecessarily voluminous when the variance of the received data is small, whereby allowing an efficient coding of the data, that can reduce a data compression amount, allowing an efficient use of a frequency band in a data communication.

It will be apparent to those skilled in the art that various modifications and variations can be made in the device and method for coding an audio/video signal of the present invention without departing from the spirit or scope of the invention. Thus, it is intended that the present invention cover the modifications and variations of this invention provided they come within the scope of the appended claims and their equivalents.

What is claimed is:

1. A device for coding an audio/video signal comprising:
    a first sample/hold unit for sampling/holding an analog video signal X(t) at a first sampling rate in response to a sampling control signal;
    a phase shifter for shifting a phase of the sampling control signal according to a variance of the video signal;
    a second sampling/hold unit for sampling/holding an analog video signal X(t) at a second sampling rate in response to the sampling control signal shifted by the phase shifter;
    a summer for summing the sampling data (+) from the first sample/hold unit and the sampling data (−) from the second sample/hold unit;
    a comparator for comparing the sampling data summed at the summer to an arbitrarily set critical value eT;
    a switching unit for selectively providing the sampling data either from the first sample/hold unit or from the second sample/hold unit in response to a signal from the comparator;
    a quantizing unit for quantizing the sampling data selectively provided by the switching unit; and,
    an encoding block for compressing a data from the quantizing unit, to provide an encoded data.

2. A device as claimed in claim 1, wherein the switching unit forwards the sampled data from the first sample/hold unit if an output from the summer is not smaller than the critical value eT, and forwards the sampled data from the second sample/hold unit 42 if the output from the summer is smaller than the critical value eT.

3. A device as claimed in claim 1, wherein the phase shifter shifts a phase of the sampling control signal by ½.

4. A device as claimed in claim 1, wherein the phase shifter is of a delay.

5. A method for coding an audio/video signal, comprising the steps of:
    sampling a filtered video signal at a fixed sampling rate and a shifted sampling rate;
    summing a sampled data (+) of the fixed sampling rate and a sampled data of a shifted sampling rate (−), and comparing the sum to an arbitrary critical value eT; and,
    as a result of the comparison of the summed sampled data to the arbitrary critical value eT, when a summed output is not smaller than the critical value eT, forwarding the sampled data of the fixed sampling rate, and when the summed output is smaller than the critical value eT, forwarding the sampled data of the shifted sampling rate.

6. A device for coding an audio/video signal comprising:
    a first sample unit for sampling an analog video signal at a first sampling rate;
    a second sample unit for sampling an analog video signal at a second sampling rate;
    a summer for summing sampling data (+) from the first sample unit and sampling data (−) from the second sample unit;
    a comparator for comparing the sampled data summed at the summer to an arbitrarily set critical value eT; and
    a switching unit for selectively providing the sampling data either from the first sampling unit or the second sample unit in response to a signal from the comparator.

* * * * *